C. E. ROBERTS.
STRAW BINDING HARVESTER.
APPLICATION FILED JAN. 29, 1912.
1,050,296.
Patented Jan. 14, 1913.
8 SHEETS—SHEET 6.
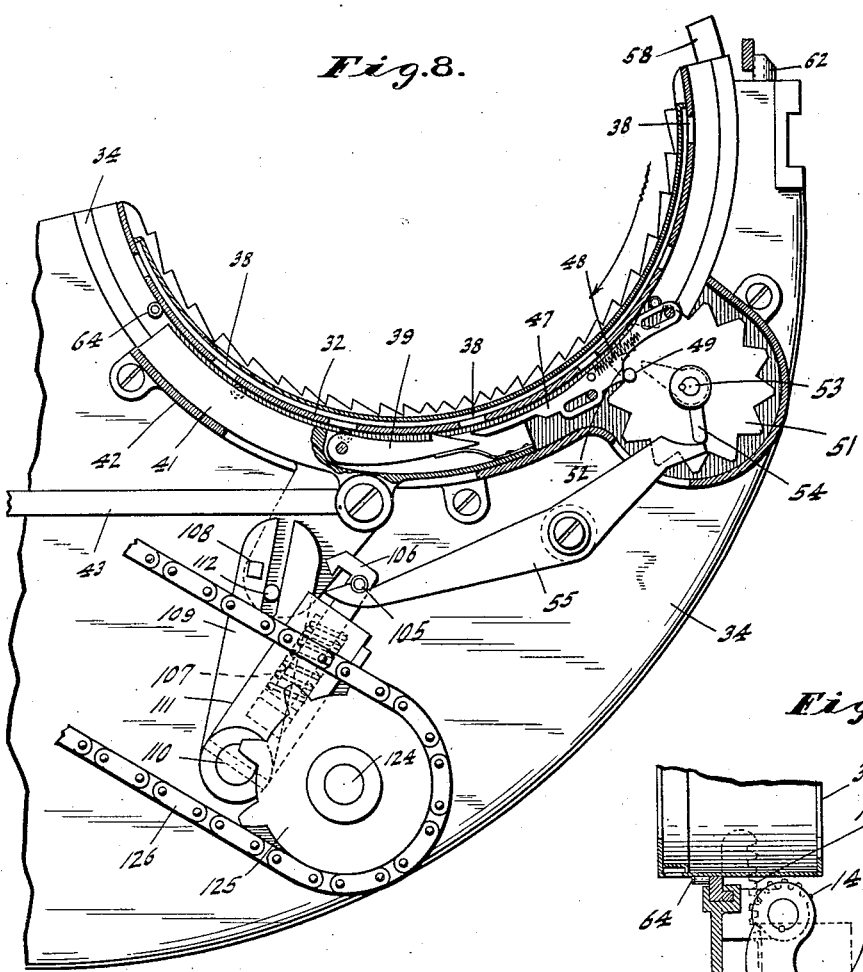
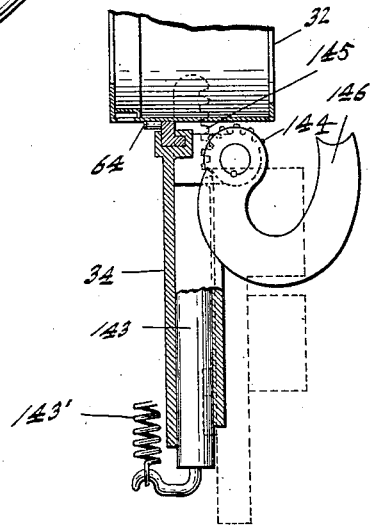

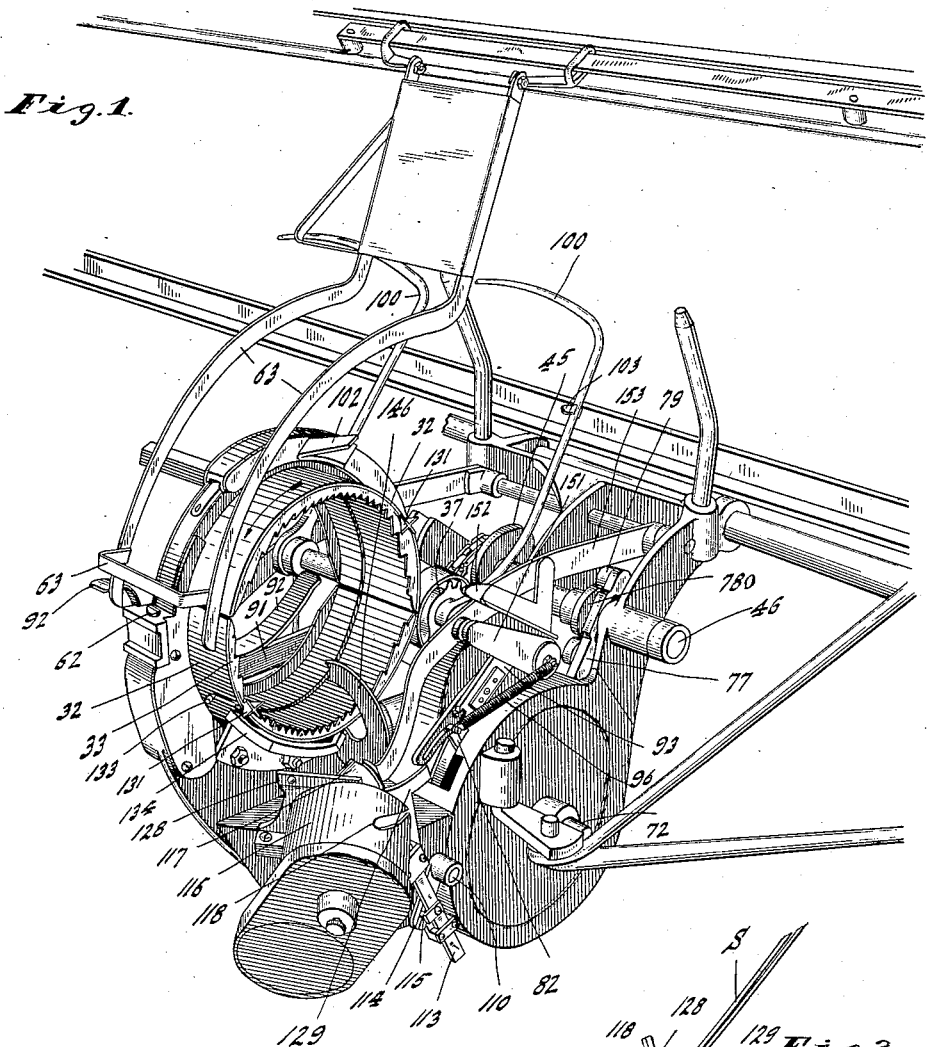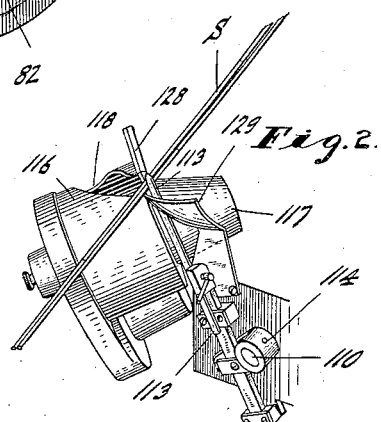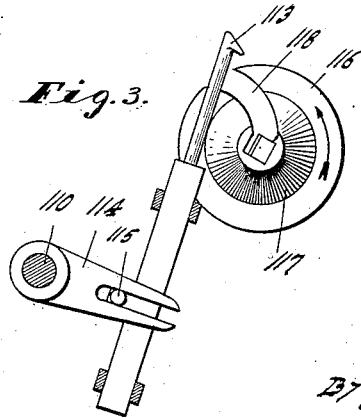

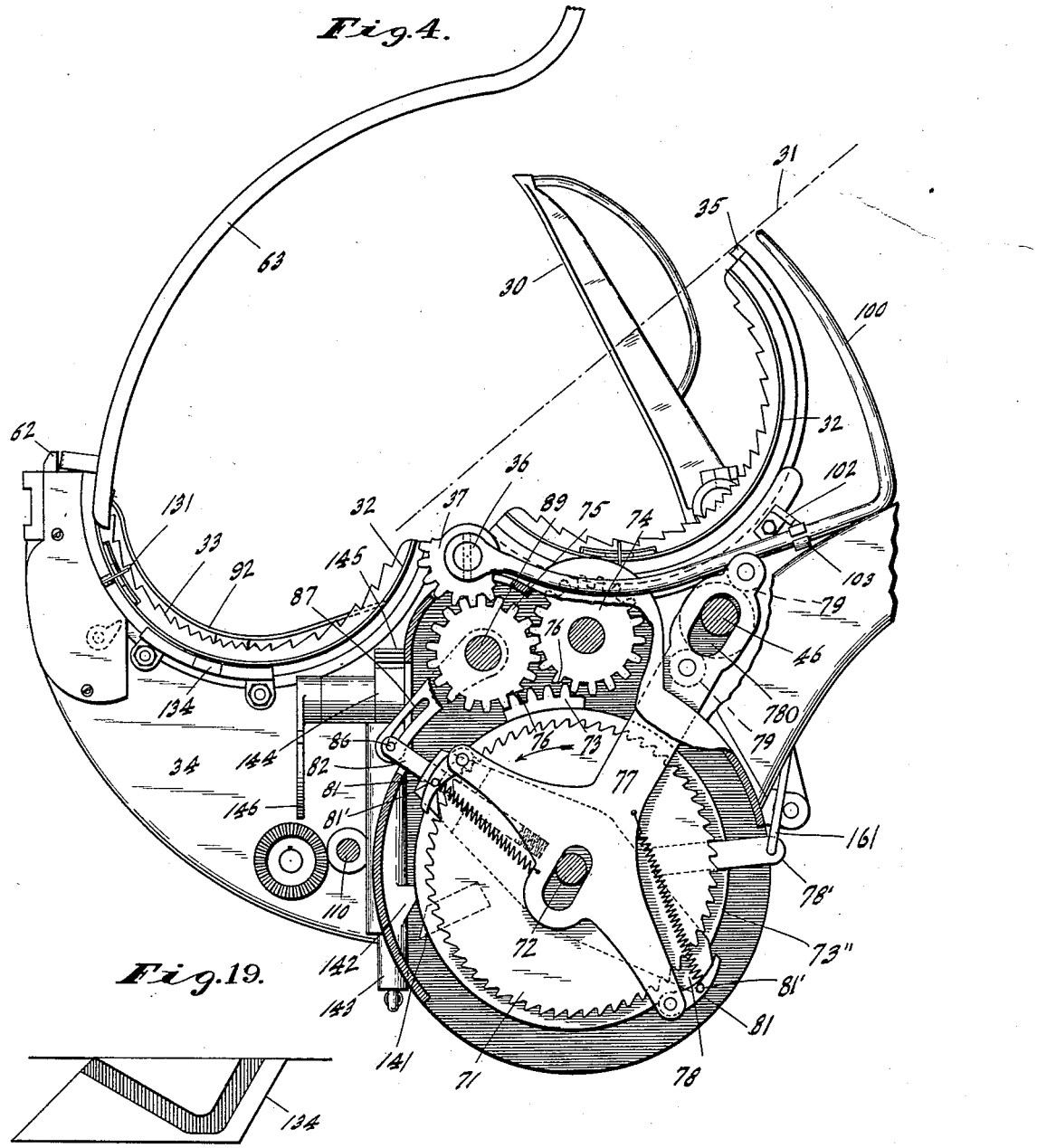

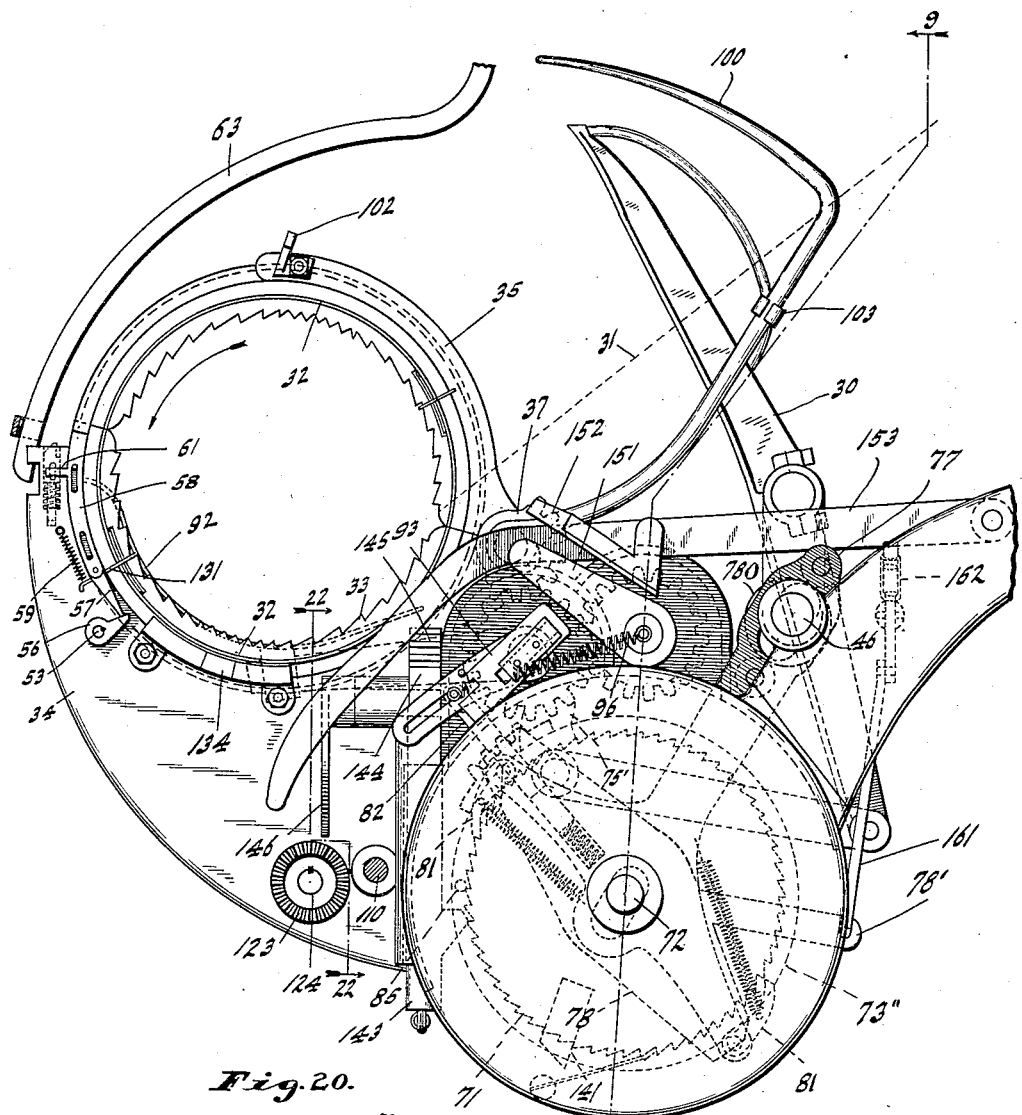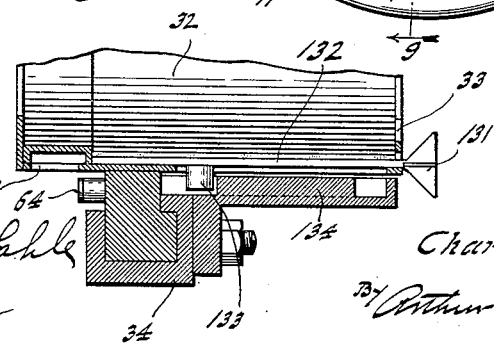

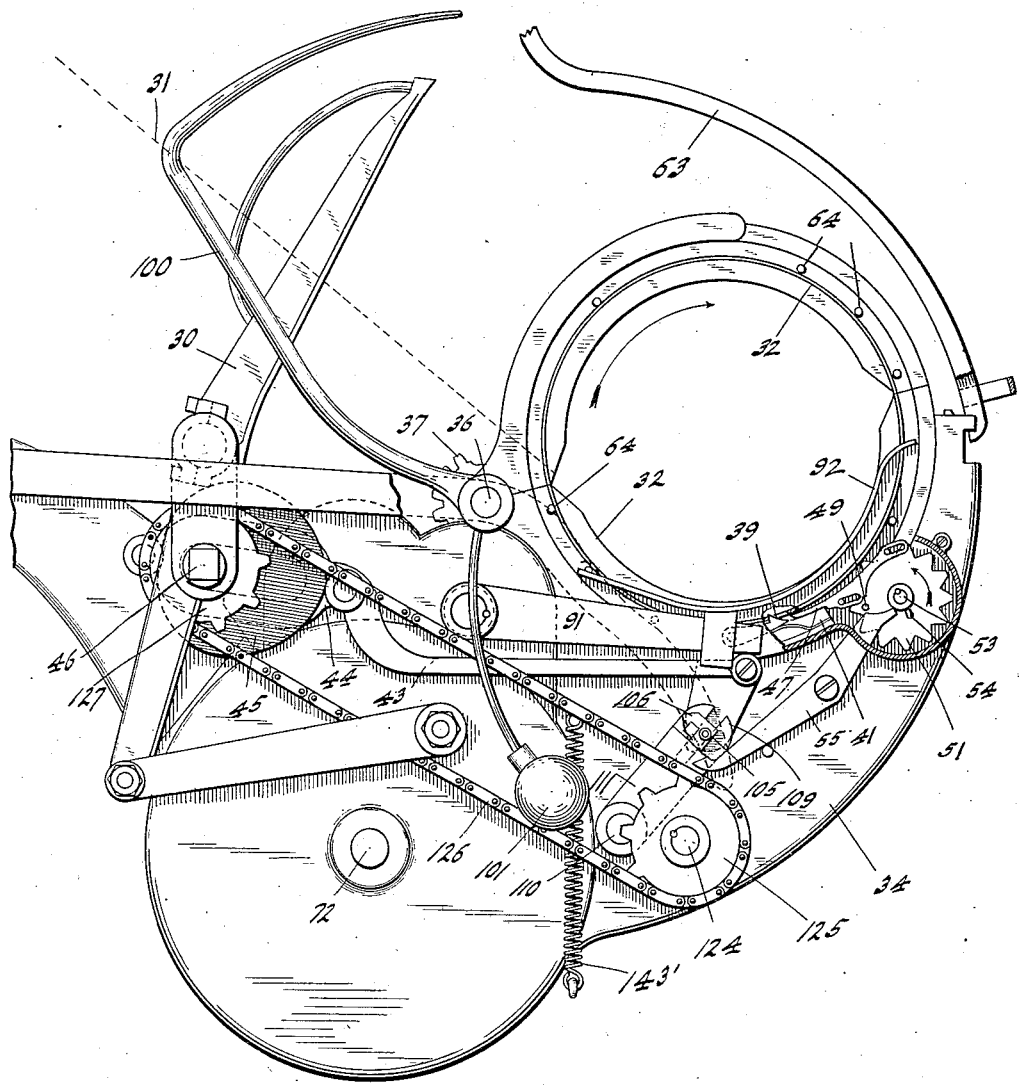

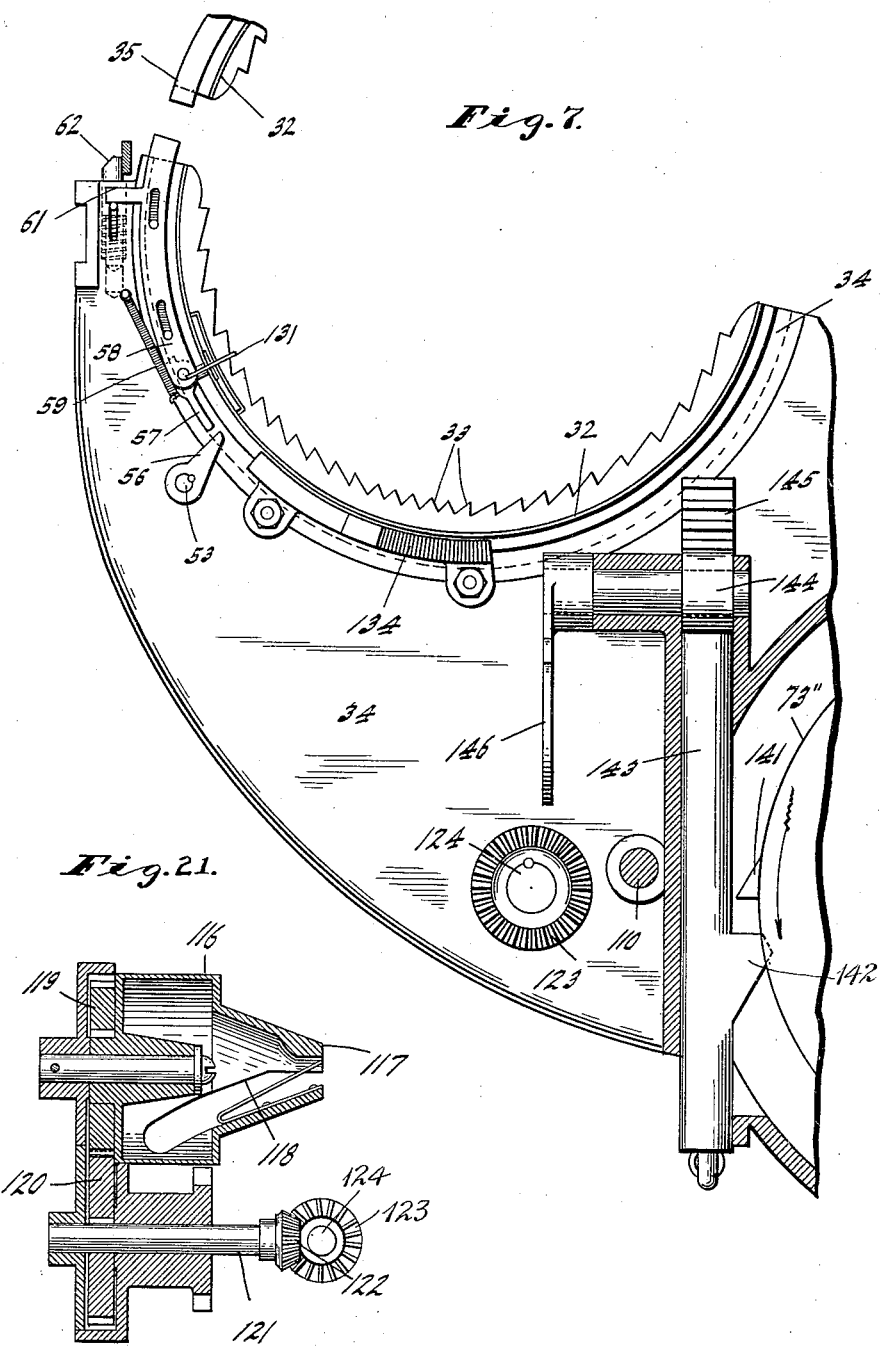

C. E. ROBERTS.
STRAW BINDING HARVESTER.
APPLICATION FILED JAN. 29, 1912.

1,050,296.

Patented Jan. 14, 1913.
8 SHEETS—SHEET 7.

Witnesses
Frank A. Fahl
S. J. Carter

Inventor
Charles E. Roberts,
By Arthur M. Hood
Attorney

C. E. ROBERTS.
STRAW BINDING HARVESTER.
APPLICATION FILED JAN. 29, 1912.

1,050,296.

Patented Jan. 14, 1913.
8 SHEETS—SHEET 8.

Witnesses
Frank A. Fahl
S. J. Carter

Inventor
Charles E. Roberts,
By Arthur M. Hood
Attorney

UNITED STATES PATENT OFFICE.

CHARLES E. ROBERTS, OF CHICAGO, ILLINOIS, ASSIGNOR TO THE BROWN STRAW BINDER COMPANY, OF INDIANAPOLIS, INDIANA, A CORPORATION OF INDIANA.

STRAW-BINDING HARVESTER.

1,050,296.

Specification of Letters Patent.  Patented Jan. 14, 1913.

Application filed January 29, 1912. Serial No. 674,089.

*To all whom it may concern:*

Be it known that I, CHARLES E. ROBERTS, a citizen of the United States, residing at Chicago, in the county of Cook and State of Illinois, have invented a new and useful Straw-Binding Harvester, of which the following is a specification.

The object of my invention is to produce a mechanism, primarily designed for use in conjunction with a harvester, by means of which bundles of harvested grain stalks may be formed by a rope of straw butts produced and secured by the operative mechanism upon segregated successive quantities of such harvested grain stalks.

The accompanying drawings illustrate my invention.

Figure 9:
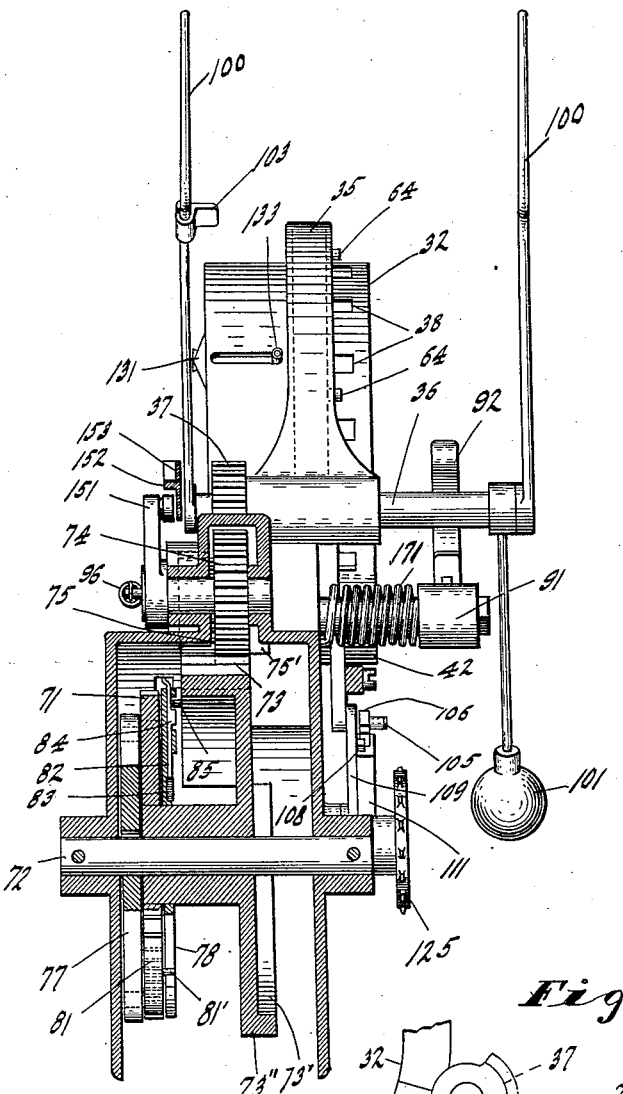
Figure 10:
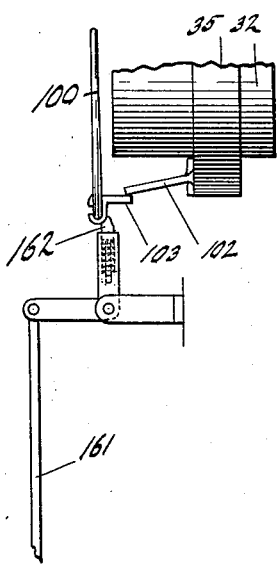
Figure 11:
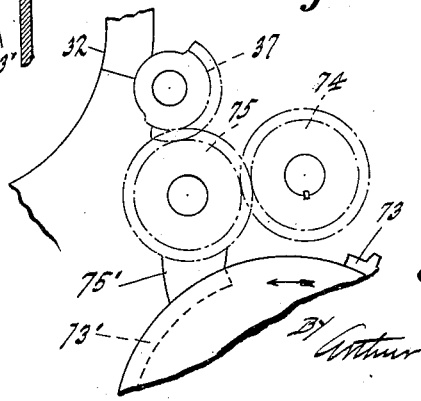
Figure 16:
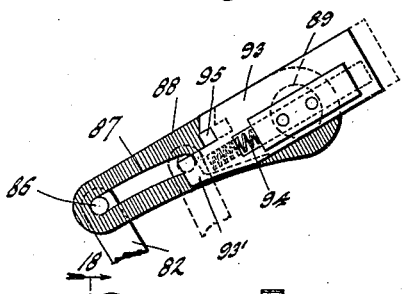
Figure 14:
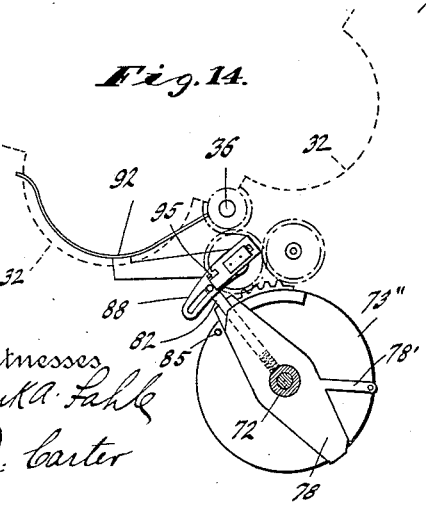
Figures 17, 18:
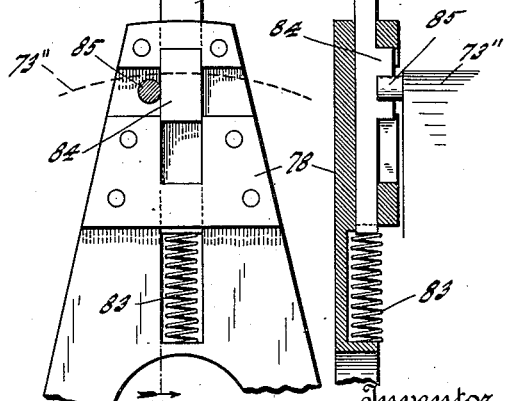

Figure 1 is a perspective view of the complete bundle-forming apparatus with adjacent portions of the frame of a harvester, and with the parts in positions occupied immediately prior to the completion of formation of a bundle; Fig. 2 a fragmentary perspective of the rope-forming mechanism; Fig. 3 a fragmentary elevation of the twister head and picker finger; Fig. 4 a side elevation, in partial vertical section of the parts in receiving position; Fig. 5 a side elevation with the parts in the positions immediately preceding the rotation of the bundle; Fig. 6 an elevation similar to Fig. 5 but of the opposite side; Fig. 7 a fragmentary elevation, on a larger scale, showing the positions of some of the parts of the bundle-rotating head immediately preceding the positions shown in Fig. 5; Fig. 8 a fragmentary vertical section showing the means for arresting the rotation movement of the bundle-rotating rings; Fig. 9 a section on line 9—9 of Fig. 5; Fig. 10 a fragmentary detail of the stop arm release; Fig. 11 a diagram of the gears for reciprocating the bundle-clamping segment; Figs. 12, 13, 14 and 15 diagrams of successive positions of the mechanism for controlling the movement of the bundle-clamping segment; Fig. 16 a fragmentary elevation of the automatic release forming part of the operating means for the bundle-clamping segment; Fig. 17 a detail of a gear-locking bolt; Fig. 18 a section on line 18—18 of Fig. 17; Fig. 19 a plan of the pusher cam; Fig. 20 a sectional detail of the pusher; Fig. 21 a detail of the twister head; and Fig. 22 a detailed sectional view of the tucker finger on line 22—22 of Fig. 5.

The normal, or receiving position of the parts is shown in Fig. 4 and the grain stalks are delivered in the usual manner by gravity, assisted by common feeder fingers 30, down an inclined deck, (indicated by the dotted line 31) into a half-ring 32 provided with internal teeth 33 to afford a sufficient bite into the mass of stalks. The half-ring 32 is movably seated in a semi-annular track or stationary cradle 34 substantially as shown in Patent 997,552, issued July 11, 1911. Coöperating with, and supplementing, the cradle 34 is a swinging clamping segment or track 35 carried by rock-shaft 36 to which is attached a segment 37. Mating half-ring 32 is another half-ring 32 provided with teeth 33. Each of the half-rings 32 is provided with teeth or pockets 38 for the reception of a pawl 39 carried by a reciprocating bar 41 mounted in a segmental track 42 in cradle 34 whereby the half-rings, when brought together, may be given step-by-step rotative advancement through cradle 34 and segment 35. Bar 41 is constantly reciprocated by link 43, reciprocating head 44 and a cam 45 carried by the constantly rotating main drive shaft 46. Pawl 39 may be rendered ineffective at desired times by means of a shoe 47 normally retracted by a spring 48 but intermittently projectable to the position shown in Fig. 8, by means of a pin 49 carried by a rotating star-wheel 51 and acting on a cam-shoulder 52 of the shoe. The shaft 53 of star-wheel 51 is provided with a finger 54 adapted, through one step of the star-wheel to act upon a lever 55 which hangs normally by gravity in the position indicated in Fig. 6. Shaft 53 also carries a finger 56 engageable by a finger 57 so as to be advanced one step of the star wheel when the finger 57 is driven downwardly by its slide 58 when engaged by segment 35 in its movement to bundle-clamping position. Slide 58 is normally held in the position shown in Fig. 7 by a spring 59 and it carries a finger 61 to retract a spring latch 62 arranged to retain the guard 63 when the parts are in stalk-receiving position.

Star wheel 51 is provided (in the present instance) with thirteen points which are operated upon by pins 64 carried by the half-rings 32 to advance the wheel twelve steps upon one and one-half rotations of the ring. The thirteenth step of wheel 51 is produced by means of finger 56, as already described.

A ratchet wheel 71, journaled on a pin 72, is fixed to a disk 73'' carrying a segment 73 adapted to successively engage two intermeshed gears 74 and 75 which are sufficiently mutilated, as indicated at 76, Fig. 4, to permit the segment to first engage and operate gear 74 and then, passing out of engagement with that gear, to engage and operate gear 75. Gear 75 is meshed with segment 37 and consequently the successive operation of the two gears 74 and 75 produces oscillation of segment 37 and segmental track 35. Ratchet wheel 71 is rotatively advanced by means of a reciprocating arm 77 actuated by a cam 780 on shaft 46, said cam engaging rollers 79 on the arm. The arm 77 carries a pair of oppositely arranged spring pawls 81, 81 which serve, whenever permitted, to drive the wheel 71 forwardly upon both strokes of the arm 77.

Figure 12:
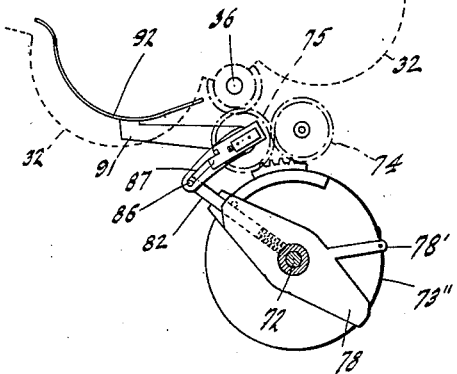
Figure 15:
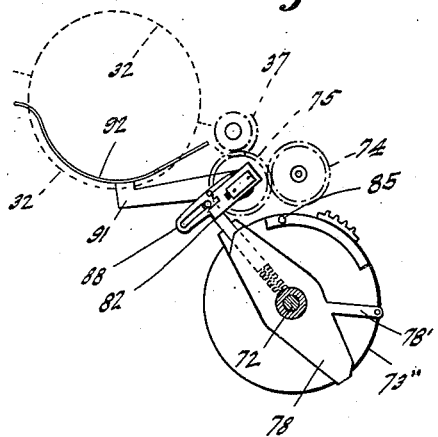
Figure 13:
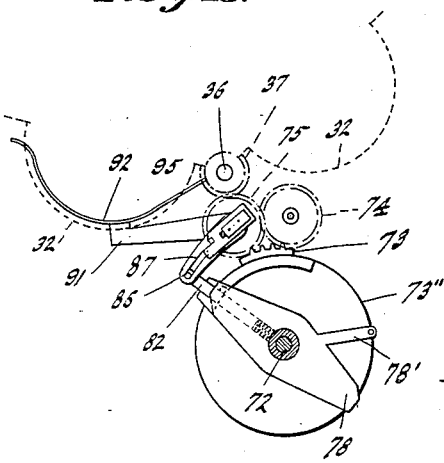

In order to arrest the forward movement of wheel 71 when segment 73 lies between the two gears 74 and 75, I provide a cam arm 78 which is journaled on pin 72 and when in the normal position indicated in Figs. 4 and 12, lies beneath pins 81' of pawls 81 so as to render them inactive. The cam arm 78 carries a radially projectable bolt 82 urged outwardly by a spring 83 and this bolt is provided with a block 84 which normally lies in the path of movement of a pin 85 carried by disk 73'' so as to block further forward movement of wheel 71 and segment 73 when the segment lies between the two gears 74 and 75. In order to retract block 84 the bolt 82 is provided at its outer end with a pin 86 which lies in a slot 87 formed in an arm 88 journaled on a rock shaft 89 upon which gear 75 is freely journaled. One end of shaft 89 carries an arm 91 provided at its outer end with a cradle 92 into which the harvested stalks are discharged. The opposite end of shaft 89, which carries the arm 88, also carries a radially sliding latch 93 normally urged to the position shown in full lines in Fig. 16 by a spring 94 so as to engage a pin 95 on arm 88 and thus lock arm 88 and shaft 89 together. When bolt 82 is driven inwardly by the operation of cradle 91 and block 84 withdrawn from in front of pin 85, a spring 96 (Fig. 1) draws arm 78 to the left (Fig. 14) so as to withdraw said arm from under the pawls 81 and draw pin 86 along slot 87 into engagement with the tip 93' of catch 93 and drive it to the position indicated in dotted lines Fig. 16, whereupon spring 83 drives bolt 82 outwardly (Fig. 15) and brings block 84 again into the path of movement of pin 85. In the meantime, pawls 81 have been advancing ratchet wheel 71 and its first action brings segment 73 into mesh with gear 75 and swings segment 35 to the position shown in Fig. 5.

Just prior to the upward movement of segment 35, the flow of straw down deck 31 is stopped by arms 100 one of which carries a finger 103 which is normally engaged and held down by a finger 102 on segment 35. Upward movement of arms 100 is produced by counterweight 101 and, as 78 is moved back by spring 96, an extension 78' on arm 78 pulls on a link 161 which in turn swings a bell crank lever 162 (Fig. 10) which operates upon the adjacent arm 100 to spring it sidewise to withdraw finger 103 from beneath finger 102 and thus permit weight 101 to swing arms 100 upward through deck 31 in advance of the upward movement of segment 35.

When segment 35 is brought to the position shown in Fig. 5, it operates, through finger 57, in the manner already described, to advance star wheel 51 one step to cause pin 54 to release lever 55, whereupon this lever drops away from a pin 105 carried by the spring catch 106 so that the spring 107 thereof may force the catch down into position to receive and retain a pin 108 carried by a slotted arm 109 pivoted upon the shaft 110 to which the catch holder 111 (in which catch 106 is mounted) is secured. Extended into the slot of arm 109, so as to reciprocate the arm, is a pin 112 carried by the bar 41 so that arm 109 is continuously reciprocated.

When the apparatus has been fully described it will become apparent that several of the parts, which are continuously driven, might be intermittently driven but, by providing automatic disconnections I have provided a less complicated mechanism than would be otherwise required.

As soon as wheel 51 is advanced by the operation of finger 56, shoe 47 is withdrawn from the path of pawl 39 and it operates on the half-rings 32 to rotate them in the cradle 34 and segment 35 so as to rotate the bundle of stalks clamped therein. At the same time the oscillation of shaft 110 reciprocates a picker finger 113 (through any suitable connections, such as the slotted arm 114 and pin 115, Fig. 3) so as to project said fingers into the bundle and extract the butt ends of a few stalks S (Fig. 2) therefrom. These withdrawn butt ends are drawn down upon the circumference of a rotating twister head 116 which is hollow and provided with a rope-forming snout 117. The straws are drawn into the interior of the twister head through a helical slot 118 and by it twisted together with subsequently introduced straws so that a rope, consisting only of the butt ends of straws, the head ends of which remain in place in the bundle, is formed around the bundle as the bundle is rotated. Head 116 is driven in any suitable manner as, for instance, gears 119, 120, shaft 121, pinion 122 (Fig. 21), pinion 123, shaft 124 (Fig. 5), sprocket 130 wheel 125, chain 126, and sprocket wheel 127 on shaft 46 (Fig. 6). The twister head is allowed to rotate continuously (in order to avoid complication of mechanism) but stoppage of the picker-finger prevents any improper extraction of straws from the bundle, the lower straws of the bundle resting on the guard plates 128 and 129 (Figs. 1 and 2). These two plates support the straws of the bundle while the straws for the band are extracted.

For the formation of the binding rope the bundle is rotated one and one-half times and the final end is tucked under the initial portion somewhat in the manner shown in Fig. 3 of Patent 780,392 issued January 17, 1905. In making this rotation of the bundle it is advisable to shift the initial portion of the rope toward the butt of the bundle so that the final end will overlie the head ends of the straws which form the initial portion. For that purpose I mount in each half ring 32 a pusher head 131 (Fig. 20) the shank 132 of which is slidable through the half ring along a line parallel with the axis of the bundle. Shank 132 is provided with a pin 133 which is caused to traverse the stationary cam 134 as the half ring is moved through cradle 34. When the rotation of the bundle is nearly completed pin 54 throws lever 55 so as to withdraw catch 106 from pin 108, thus stopping the picker finger, and then pin 49 engages shoe 47 and projects it into the path of pawl 39 so as to stop the bundle. Continued forward movement of wheel 71 brings a finger 141 into engagement with a finger 142 carried by a plunger 143 which is provided with a rack 145 engaging a segment 144 on the shaft of a tucker finger 146 which is thereby projected upwardly (as shown in Fig. 1) to tuck a bight of the final end of the binding rope between the bundle and an initial portion of the rope. Finger 146 is returned to normal position by means of spring 143'. Further movement of wheel 71 brings segment 73 into mesh with gear 74; the segment 35 is thrown back to the position shown in Fig. 4. At the same time an arm 151, carried by the shaft of gear 74, engages a cam 152 on an ejector arm 153 and causes the ejection of the completed bundle from the machine, guards 63 swinging upwardly as the bundle is ejected and then dropping with sufficient force to drop in behind catch 62. As segment 35 swings back finger 102 engages finger 103 and moves the stop arms 100 downward so that the flow of straw may resume.

The quantity of grain stalks for any bundle should of course be considerably compressed between the two half-rings 32 and segment 35 therefore should be locked in the position shown in Fig. 6. For this purpose gear 75 is provided with a locking cam 75' (Fig. 11) which coacts with a segmental flange 73' (Figs. 9 and 11) in a common manner.

The twister head 116 has its main body of considerable diameter and practically tangential to the bundle (when it is clamped) so that when the butt ends of the straws are drawn down by the picker finger the extreme ends are swung away from the head (while an intermediate portion is first drawn down into the slot) and the extreme butt ends are thus prevented from wrapping about the exterior of the twister head and its shaft while being drawn into its interior.

As segment 35 is returned to normal position, pin 85 engages block 84 and drives arm 78 to its initial position where it prevents action of pawls 81 upon ratchet wheel 71 and as the completed bundle is ejected a spring 171 (Fig. 9) returns the arm 91 and cradle 92 to normal position, and the latch 93 reëngages with pin 95.

I claim as my invention:

1. In a binder, the combination of a cradle track, a coöperating segment track, two bundle-carrying half-rings adapted to traverse said two tracks when in coöperative position, a rotary driver, a forwarding gear and a reversing gear arranged for successive operation by the driver, said two gears operatively connected with the segment track to alternately swing it to and away from coöperative relation with the cradle track, means for advancing the half-rings in the tracks when in coöperative relation, and means operated by the movement of said half-rings to discontinue advancement thereof.

2. In a binder, the combination of a cradle track, a coöperating segment track, two bundle-carrying half-rings adapted to traverse said two tracks when in coöperative position, a rotary driver, a forwarding gear and a reversing gear arranged for successive operation by the driver, said two gears operatively connected with the segment track to alternately swing it to and away from coöperative relation with the cradle track, means for advancing the half-rings in the tracks when in coöperative relation, and means controlled by the movement of the segment track to coöperative relation with the cradle-track to connect the advancing means to said half-rings.

3. In a binder, the combination of a cradle track, a coöperating segment track, two bundle-carrying half-rings adapted to traverse said two tracks when in coöperative position, a rotary driver, a forwarding gear and a reversing gear arranged for successive operation by the driver, said two gears operatively connected with the segment track to alternately swing it to and away from coöperative relation with the cradle track, means for advancing the half-rings in the tracks when in coöperative relation, means operated by the movement of said half-rings to discontinue advancement thereof, and means controlled by the movement of the segment track to coöperative relation with the cradle-track to connect the advancing means to said half-ring.

4. In a binder, the combination of a cradle track, a coöperating segment track, two bundle-carrying half-rings adapted to traverse said two tracks when in coöperative position, a rotary driver, a forwarding gear and a reversing gear arranged for successive operation by the driver, said two gears operatively connected with the segment track to alternately swing it to and away from coöperative relation with the cradle track, a reciprocating pawl engageable with said half-rings to advance the same in the tracks, a shoe projectable relative to said pawl to render the same ineffective, a star wheel operated upon by the half-rings and operating upon the shoe, two engageable members, one carried by the segment track and the other carried by the star-wheel whereby establishment of coöperative relation of the two tracks produces engagement of said two engageable members to advance the star-wheel and establish coöperative relationship between the half-rings and the pawl, pins carried by the half-rings to advance the star-wheel to cause projection of the shoe to disestablish coöperation between the half-rings and pawl, a picker projectable into the bundle to extract straw ends therefrom, a twister head receiving said straw ends from the picker, a rock-shaft, connections between the rock-shaft and picker, a reciprocating driver for said rock-shaft, a detachable connection between the said driver and rock-shaft, and means controlled by the star wheel for controlling said detachable connection.

5. In a binder, the combination of a cradle track, a coöperating segment track, two bundle-carrying half-rings adapted to traverse said two tracks when in coöperative position, a rotary driver, a forwarding gear and a reversing gear arranged for successive operation by the driver, said two gears operatively connected with the segment track to alternately swing it to and away from coöperative relation with the cradle track, a reciprocating pawl engageable with said half-rings to advance the same in the tracks, a shoe projectable relative to said pawl to render the same ineffective, a star wheel operated upon by the half-rings and operating upon the shoe, two engageable members, one carried by the segment track and the other carried by the star-wheel whereby establishment of coöperative relation of the two tracks produces engagement of said two engageable members to advance the star-wheel and establish coöperative relationship between the half-rings and the pawl, pins carried by the half-rings to advance the star wheel to cause projection of the shoe to disestablish coöperation between the half-rings and pawl, a picker projectable into the bundle to extract straw ends therefrom, and a twister head receiving said straw ends from the picker.

6. In a binder, the combination of a cradle track, a coöperating segment track, two bundle-carrying half-rings adapted to traverse said two tracks when in coöperative position, a rotary driver, a forwarding gear and a reversing gear arranged for successive operation by the driver, said two gears operatively connected with the segment track to alternately swing it to and away from coöperative relation with the cradle track, a reciprocating pawl engageable with said half-rings to advance the same in the tracks, a shoe projectable relative to said pawl to render the same ineffective, a star wheel operated upon by the half-rings and operating upon the shoe, two engageable members, one carried by the segment track and the other carried by the star-wheel whereby establishment of coöperative relation of the two tracks produces engagement of said two engageable members to advance the star-wheel and establish coöperative relationship between the half-rings and the pawl, pins carried by the half-rings to advance the star wheel to cause projection of the shoe to disestablish coöperation between the half-rings and pawl, a rock-shaft, connections between the rock-shaft and picker, a reciprocating driver for said rock-shaft, a detachable connection between the said driver and rock-shaft, and means controlled by the star wheel for controlling said detachable connection.

7. In a binder, the combination of a cradle track, a coöperating segment track, two bundle-carrying half-rings adapted to traverse said two tracks when in coöperative position, a rotary driver, a forwarding gear and a reversing gear arranged for successive operation by the driver, said two gears operatively connected with the segment track to alternately swing it to and away from coöperative relation with the cradle track, a reciprocating pawl engageable with said half-rings to advance the same in the track, a shoe projectable relative to said pawl to render the same ineffective, a star wheel operated upon by the half-rings and operating upon the shoe, two engageable members, one carried by the segment track and the other carried by the star-wheel whereby establishment of coöperative relation of the two tracks produces engagement of said two engageable members to advance the star-wheel and establish coöperative relationship between the half-rings and the pawl, a picker projectable into the bundle to extract straw ends therefrom, a twister head receiving said straw ends from the picker, a rock-shaft, connections between the rock-shaft and picker, a reciprocating driver for said rock-shaft, a detachable connection between the said driver and rock-shaft, and means controlled by the star wheel for controlling said detachable connection.

8. In a binder, the combination of a cradle track, a coöperating segment track, two bundle-carrying half-rings adapted to traverse said two tracks when in coöperative position, a rotary driver, a forwarding gear and a reversing gear arranged for successive operation by the driver, said two gears operatively connected with the segment track to alternately swing it to and away from coöperative relation with the cradle track, a reciprocating pawl engageable with said half-rings to advance the same in the tracks, a shoe projectable relative to said pawl to render the same ineffective, a star wheel operated upon by the half-rings and operating upon the shoe, two engageable members, one carried by the segment track and the other carried by the star-wheel whereby establishment of coöperative relation of the two tracks produces engagement of said two engageable members to advance the star-wheel and establish coöperative relationship between the half-rings and the pawl, a rock-shaft, connections between the rock-shaft and picker, a reciprocating driver for said rock-shaft, a detachable connection between the said driver and rock-shaft, and means controlled by the star wheel for controlling said detachable connection.

9. In a binder, the combination of a cradle track, a coöperating segment track, two bundle-carrying half-rings adapted to traverse said two tracks when in coöperative position, a rotary driver, a forwarding gear and a reversing gear arranged for successive operation by the driver, said two gears operatively connected with the segment track to alternately swing it to and away from coöperative rotation with the cradle track, a reciprocating pawl engageable with said half-rings to advance the same in the tracks, a shoe projectable relative to said pawl to render the same ineffective, a star wheel operated upon by the half-rings and operating upon the shoe, two engageable members, one carried by the segment track and the other carried by the star-wheel whereby establishment of coöperative relation of the two tracks produces engagement of said two engageable members to advance the star-wheel and establish coöperative relationship between the half-rings and the pawl, a picker projectable into the bundle to extract straw ends therefrom, and a twister head receiving said straw ends from the picker.

10. In a binder, the combination of a cradle track, a coöperating segment track, two bundle-carrying half-rings adapted to traverse said two tracks when in coöperative position, a rotary driver, a forwarding gear and a reversing gear arranged for successive operation by the driver, said two gears operatively connected with the segment track to alternately swing it to and away from coöperative relation with the cradle track, a reciprocating pawl engageable with said half-rings to advance the same in the tracks, a shoe projectable relative to said pawl to render the same ineffective, a star wheel operated upon by the half-rings and operating upon the shoe, two engageable members, one carried by the segment track and the other carried by the star-wheel whereby establishment of coöperative relation of the two tracks produces engagement of said two engageable members to advance the star-wheel and establish coöperative relationship between the half-rings and the pawl, and pins carried by the half-rings to advance the star wheel to cause projection of the shoe to disestablish coöperation between the half-rings and pawl.

11. In a binder, the combination of a cradle track, a coöperating segment track, two bundle-carrying half-rings adapted to traverse said two tracks when in coöperative position, a rotary driver, a forwarding gear and a reversing gear arranged for successive operation by the driver, said two gears operatively connected with the segment track to alternately swing it to and away from coöperative relation with the cradle track, a picker arranged to extract straw ends from the bundle, a twister arranged to receive the straw ends from the picker and twist the same into a rope around the bundle, a pusher carried by each half-ring and arranged to push the initial end of the rope axially of the bundle so as to be overlapped by the final end of the rope, a tucker movable axially of the bundle to engage the final end of the rope and tuck a bight thereof between the initial end of the rope and the bundle, and means driven by the rotary driver for actuating said tucker.

12. In a binder, the combination of a cradle track, a coöperating segment track, two bundle-carrying half-rings adapted to traverse said two tracks when in coöperative position, a rotary driver, a forwarding gear and a reversing gear arranged for successive operation by the driver, said two gears operatively connected with the segment track to alternately swing it to and away from coöperative relation with the cradle track, a picker arranged to extract straw ends from the bundle, a twister arranged to receive the straw ends from the picker and twist the same into a rope around the bundle, a pusher arranged to push the initial end of the rope axially of the bundle so as to be overlapped by the final end of the rope, a tucker movable axially of the bundle to engage the final end of the rope and tuck a bight thereof between the initial end of the rope and the bundle, and means driven by the rotary driver for actuating said tucker.

13. In a binder, the combination of a cradle track, a coöperating segment track, two bundle-carrying half-rings adapted to traverse said two tracks when in coöperative position, a rotary driver, a forwarding gear and a reversing gear arranged for successive operation by the driver, said two gears operatively connected with the segment track to alternately swing it to and away from coöperative relation with the cradle track, a picker arranged to extract straw ends from the bundle, a twister arranged to receive the straw ends from the picker and twist the same into a rope around the bundle, a tucker movable axially of the bundle to engage the final end of the rope and tuck a bight thereof between the initial end of the rope and the bundle, and means driven by the rotary driver for actuating said tucker.

14. In a binder, the combination of a cradle track, a coöperating segment track, two bundle-carrying half-rings adapted to traverse said two tracks when in coöperative position, a rotary driver, a forwarding gear and a reversing gear arranged for successive operation by the driver, said two gears operatively connected with the segment track to alternately swing it to and away from coöperative relation with the cradle track, a picker arranged to extract straw ends from the bundle, a twister arranged to receive the straw-ends from the picker and twist the same into a rope around the bundle, a pusher carried by each half-ring and arranged to push the initial end of the rope axially of the bundle so as to be overlapped by the final end of the rope, a tucker movable axially of the bundle to engage the final end of the rope and tuck a bight thereof between the initial end of the rope and the bundle, and means for actuating said tucker.

15. In a binder, the combination of a cradle track, a coöperating segment track, two bundle-carrying half-rings adapted to traverse said two tracks when in coöperative position, a rotary driver, a forwarding gear and a reversing gear arranged for successive operation by the driver, said two gears operatively connected with the segment track to alternately swing it to and away from coöperative relation with the cradle track, a picker arranged to extract straw ends from the bundle, a twister arranged to receive the straw ends from the picker and twist the same into a rope around the bundle, a pusher arranged to push the initial end of the rope axially of the bundle so as to be overlapped by the final end of the rope, a tucker movable axially of the bundle to engage the final end of the rope and tuck a bight thereof between the initial end of the rope and the bundle, and means for actuating said tucker.

16. In a binder, the combination of a cradle track, a coöperating segment track, two bundle-carrying half-rings adapted to traverse said two tracks when in coöperative position, a rotary driver, a forwarding gear and a reversing gear arranged for successive operation by the driver, said two gears operatively connected with the segment track to alternately swing it to and away from coöperative relation with the cradle track, a picker arranged to extract straw ends from the bundle, a twister arranged to receive the straw ends from the picker and twist the same into a rope around the bundle, a tucker movable axially of the bundle to engage the final end of the rope and tuck a bight thereof between the initial end of the rope and the bundle, and means for actuating said tucker.

17. In a binder, the combination of a cradle track, a coöperating segment track, two bundle-carrying half-rings adapted to traverse said two tracks when in coöperative position, a rotary driver, a forwarding gear and a reversing gear arranged for successive operation by the driver, said two gears operatively connected with the segment track to alternately swing it to and away from coöperative relation with the cradle track, a reciprocating pawl engageable with said half-rings to advance the same in the tracks, a shoe projectable relative to said pawl to render the same ineffective, a star wheel operated upon by the half-rings and operating upon the shoe, two engageable members, one carried by the segment track and the other carried by the star-wheel whereby establishment of coöperative relation of the two tracks produces engagement of said two engageable members to advance the star-wheel and establish coöperative relationship between the half-rings and the pawl, pins carried by the half-rings to advance the star-wheel to cause projection of the shoe to disestablish coöperation between the half-rings and pawl, a picker projectable into the bundle to extract straw ends therefrom, a twister head receiving said straw ends from the picker, a rock-shaft, connections between the rock-shaft and picker, a reciprocating driver for said rock-shaft, a detachable connection between the said driver and rock-shaft, means controlled by the star wheel for controlling said detachable connection, a pusher carried by one of the half-rings and arranged to push the initial end of the rope axially of the bundle so as to be overlapped by the final end of the rope, a tucker movable axially of the bundle to engage the final end of the rope and tuck a bight thereof between the initial end of the rope and the bundle, an actuator for said tucker, and a member carried by the rotary driver for driving said actuator.

18. In a binder, the combination of a cradle-track, a segment track movable into and out of coöperative relation with the cradle-track, a pair of bundle-carrying half-rings adapted to traverse said tracks when in coöperative relation, a driver for said half-rings, and means controlled by the movement of the segment track to closed position to connect said driver to the half-rings.

19. In a binder, the combination of a cradle-track, a segment track movable into and out of coöperative relation with the cradle-track, a pair of bundle-carrying half-rings adapted to traverse said tracks when in coöperative relation, a reciprocating pawl for advancing said half rings in the tracks, a shoe projectable relative to the pawl to control its action on the half-rings, means controlled by the forward movement of the half-rings for projecting the shoe to render the pawl inactive, and means controlled by the movement of the segment track to closed position to project the shoe to render the pawl active.

20. In a binder, the combination of a cradle-track, a segment track movable into and out of coöperative relation with the cradle-track, a pair of bundle-carrying half-rings adapted to traverse said tracks when in coöperative relation, a reciprocating pawl for advancing said half-rings in the tracks, a shoe projectable relative to the pawl to control its action on the half-rings, a star wheel operating upon the shoe to control its position relative to the pawl, members carried by the half-rings for engaging and advancing the star-wheel to project the shoe to render the pawl inactive, and a member carried by the segment track to advance the star wheel to project the shoe to render the pawl active.

21. In a straw binder, the combination of a pair of bundle-carrying half-rings, means for rotating the same with a bundle, a picker, a twister head, means for pushing the initial end of the straw-rope axially of the bundle during formation of the final end of the rope whereby the final end of the rope is overlaid upon the initial end, a tucker, and means for driving the tucker axially of the bundle to carry a bight of the final end of the rope between the initial end and the bundle.

22. In a straw binder, the combination of a pair of bundle-carrying half-rings, means for rotating the same with a bundle, a picker, a twister head, a pusher carried by one of the half-rings, means for driving said pusher axially of the bundle to push the initial end of the straw-rope axially of the bundle during formation of the final end of the rope whereby the final end of the rope is overlaid upon the initial end, a swinging tucker with an end swinging in a plane substantially in the axial plane of the bundle, and means for swinging said tucker to drive a bight of the rope between the initial end and the bundle.

In witness whereof, I, have hereunto set my hand and seal at Chicago, Illinois, this 11th day of January, A. D. one thousand nine hundred and twelve.

CHARLES E. ROBERTS. [L. s.]

Witnesses:
 PEARL ABRAMS,
 ESTHER ABRAMS.